United States Patent [19]
Sion et al.

[11] Patent Number: 5,603,213
[45] Date of Patent: Feb. 18, 1997

[54] INJECTION SYSTEM WITH CONCENTRIC SLITS AND THE ASSOCIATED INJECTION ELEMENTS

[75] Inventors: Martin Sion, Mantes-la-Jolie; André Beaurain, Chambly; Pierre Desclos, Vernon, all of France

[73] Assignee: Societe Europeenne de Propulsion, Suresnes, France

[21] Appl. No.: 362,531

[22] PCT Filed: May 6, 1994

[86] PCT No.: PCT/FR94/00529

§ 371 Date: Jan. 5, 1995

§ 102(e) Date: Jan. 5, 1995

[87] PCT Pub. No.: WO94/27038

PCT Pub. Date: Nov. 24, 1994

[30] Foreign Application Priority Data

May 11, 1993 [FR] France ................................. 93 05626

[51] Int. Cl.[6] ..................................................... F02K 9/00
[52] U.S. Cl. ............................................. 60/258; 239/424
[58] Field of Search ....................... 60/258, 39.465; 239/418, 423, 424, 434.5

[56] References Cited

U.S. PATENT DOCUMENTS

| | | | |
|---|---|---|---|
| 3,050,262 | 8/1962 | Curtis | 239/424 |
| 3,085,393 | 4/1963 | Hamlin et al. | 60/259 |
| 3,242,670 | 3/1966 | Buswell | 60/258 |
| 3,446,024 | 5/1969 | Lewis et al. | |
| 3,780,952 | 12/1973 | Huang | 60/258 |
| 4,722,181 | 2/1988 | Yu | |

FOREIGN PATENT DOCUMENTS

| | | |
|---|---|---|
| 2570129 | 3/1986 | France . |
| 1290375 | 3/1969 | Germany . |
| 731739 | 6/1955 | United Kingdom . |

*Primary Examiner*—Charles G. Freay
*Attorney, Agent, or Firm*—Weingarten, Schurgin, Gagnebin & Hayes LLP

[57] ABSTRACT

The present invention relates to a parallel-sheet injector provided with a body about an axis to which there is coaxially connected at least one annular injection element comprising a central annular injection slit surrounded by two other annular injection slits. The central annular slit is fed with a second propellant which enters at the top of the injection element level with said central slit and the other annular slits are fed with a first propellant which enters at the base of the injection element, on either side of the central slit, and passes through an annular homogenization cavity from which it flows towards the annular slits surrounding the central injection slit. The invention also relates to injection elements which may be used within the scope of this injector.

18 Claims, 4 Drawing Sheets

INJECTION SYSTEM WITH CONCENTRIC SLITS AND THE ASSOCIATED INJECTION ELEMENTS

The present invention relates to an injector with concentric slits, as well as to the associated injection elements, this injector being intended to be used in rocket engine combustion units such as the propulsion chamber itself or the combustion chambers of gas generators.

BACKGROUND OF THE INVENTION

The injector is a part which comprises one or more injection elements allowing the combustion unit to be fed with the propellant(s) necessary for its operation, such that there is rapid and complete mixing of these propellants so as to ensure stable and homogeneous combustion.

In the case of engines using cryogenic propellants, it is customary to employ injectors using injection elements with coaxial jets. However, such an injection system is not suited to all operating conditions, and in particular, it rapidly exceeds its limits and gives unsatisfactory results when high performance is demanded as regards the injection of very high propellant flowrates. With such a system, it is therefore not possible to expect significant cost savings.

By contrast, the injector geometry described in the NASA report "Noncircular orifices holes and advanced fabrication techniques for liquid rocket injectors", published in the journal: NASA CR 134315 MAY 1974, allows operation at high flowrates to be envisaged, the different injection elements having a structure with rectangular slits, the performance and characteristics of which are independent of the injected flowrate. Nevertheless, the geometry is not entirely satisfactory because it is not simple to produce, the integration of the elements into an injector being particularly complex, and moreover, the performance which results is greatly reduced by incomplete mixing at the ends of that slit due to the presence at that location of an excess of hydrogen relative to oxygen.

Patent U.S. Pat. No. 3,446,024 seeks to suppress this end effect by producing an injector with an injection element which is circular rather than rectilinear. However, the geometry disclosed in that document restricts possibilities of arranging a plurality of injection elements at a single injector, and the way in which propellants are fed to the different sheets does not guarantee identical flowrates for the propellants, i.e. quality flows and therefore good combustion.

OBJECTS AND SUMMARY OF THE INVENTION

An object of the present invention is to alleviate the drawbacks in the prior art by using a new injector architecture with parallel sheets which ensures high performance even at very high flowrates. Another object of the invention is to propose a simple injector with a particularly small number of component parts, thereby reducing production costs compared with those of the prior art. A further object of the invention is to obtain a reliable injector without the risk of creating fluid losses which give rise to undesired mixing of the propellants or cause hot spots from which deterioration within the combustion chamber originates.

These objects are achieved by a parallel sheet injector provided with a body about an axis to which there is coaxially connected at least one annular injection element comprising a central annular injection slit surrounded by two other annular injection slits, wherein said central annular slit is fed with a second propellant which enters at the top of the injection element level with said central slit and wherein said other annular slits are fed with a first propellant which enters at the base of the injection element, on either side of the central slit, and passes through an annular homogenization cavity from which it flow towards the annular slits surrounding the central injection slit.

The injection element is fed with the first propellant from a central cavity and from at least one other annular cavity arranged at the inlet and at the base of said injection element and fed from bores arranged parallel to the axis and extending, from a propellant feed cavity, into one or more concentric annuluses. Likewise, this injection element is fed with the second propellant from at least one annular cavity arranged at the inlet and at the top of said injection element and fed from passages arranged perpendicular to the axis and extending radially from a propellant feed torus. Preferably, the torus is coaxially connected to the injector body.

The number and dimensions of the passages and of the bores are chosen so that the propellants flow with identical speeds through the injection slits of the various injectors.

Advantageously, the injector is separate from the combustion unit and connected to it via a central wall and at least one other wall, these walls being held firm between the injection elements and the injector body. The central wall may be screwed to one end of the injection element or it may be integral with the injection element.

In a preferred embodiment of the invention, the injector comprises two concentric annular injection elements. In this configuration, support of the intermediate separating wall may be reinforced by the presence of columns integral with the injector body and uniformly spaced about its lower end.

By means of this architecture, the propellants are conveyed to the injection slits at identical low speeds so as not to generate different head losses at different injection points, thereby guaranteeing a constant propellant flowrate at each point of the injection slit. Moreover, the flow of propellant along the walls which separate the injector from the chamber avoids excessive heating of said walls.

Preferably, the injector body also includes an annular space which opens, at the separating walls, into the combustion unit chamber, so as to create a built-in resonance zone which guarantees stability of combustion.

Each injection element intended to be used in an injector of the invention comprises an external ring and an internal ring which are concentric and between which there extends an externally converging annular portion integral with an upper part which forms a cover covering the two rings, an internal space disposed between said two rings and the upper portion, on either side of the annular portion, this space allowing homogenization of the first propellant. This internal space is partitioned by walls of dimensions which are chosen to ensure the head losses necessary for controlling the flowrate of said propellant.

Each of the internal and external rings comprises a converging wall which faces the externally converging annular portion, two constant dimension spaces being maintained between said walls and the annular portion so as to form the annular injection slits for the first propellant. Moreover, each of the converging walls of the internal and external rings is extended by diverging walls to form a confinement zone within which the propellants are mixed.

By being confined in this way, the hydrogen (in the case of a LH2/LOX mixture) can retain all of its speed so as to promote atomization of the propellants and therefore ensure good combustion. Likewise, the development of the flame between the two walls of the diverging part thereby created will be similar for each injection element, particularly as regards flame length, thereby ensuring better homogeneity of the combustion gases.

The connection between the annular injection slits and the cavities is provided by calibration orifices pierced through the internal and external rings forming the walls of the injection element. Likewise, the connection between the central injection slit and the annular cavities is provided by calibration orifices, advantageously oblong in shape, pierced through the upper part of that injection element.

BRIEF DESCRIPTION OF THE DRAWINGS

Other features and advantages of the present invention appear more clearly from the following description given by way of non-limiting example, and made with reference to the accompanying drawings, in which.

MORE DETAILED DESCRIPTION

Figure 1:
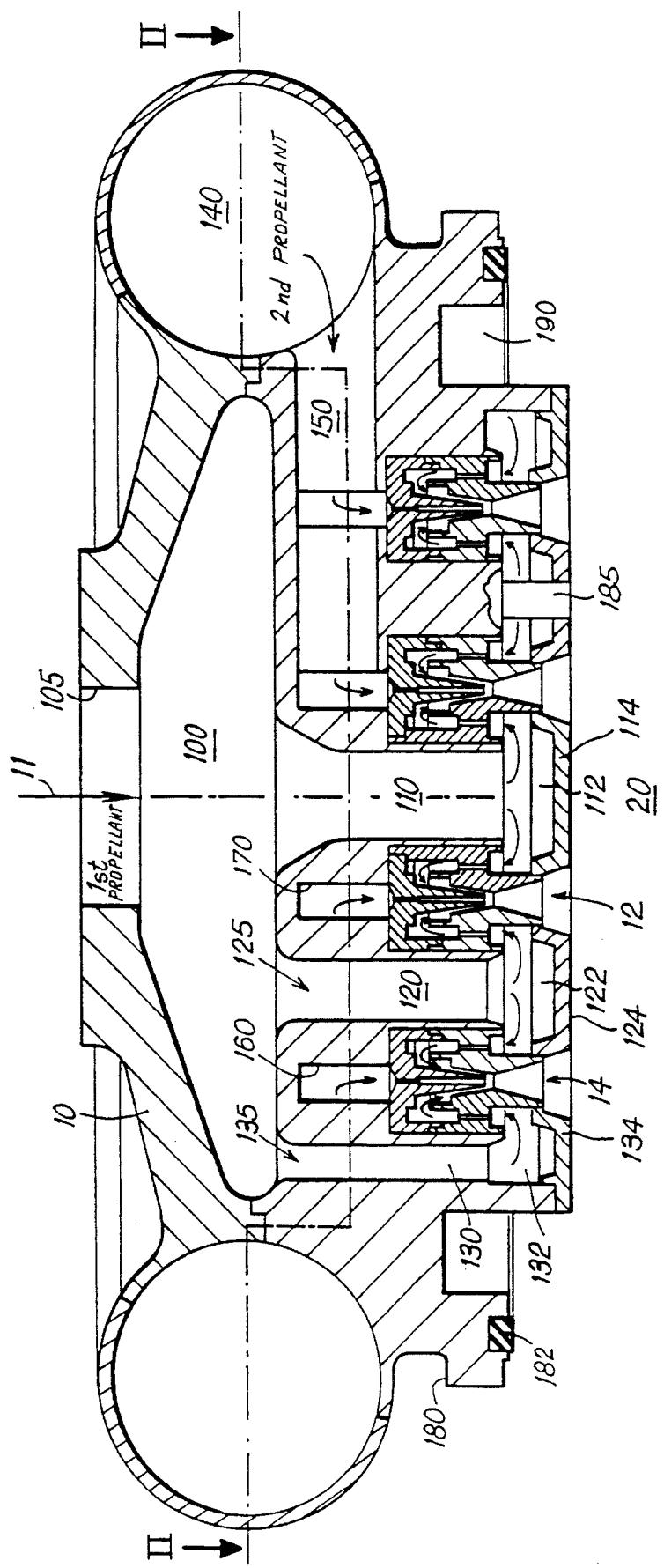
FIG. 1 shows an injection system of the invention on section line I—I of FIG. 2.

FIG. 1 shows in section an injection system of the invention. This system comprises a body 10 about an axis 11 which is also the axis of revolution of the combustion unit to which the injection system is fitted. This body is intended to receive at least one annular parallel-sheet injection element, which is coaxially connected to the body and which comprises three annular injection slits: one slit being fed with a second propellant and the other two slits which surround the first being fed with a first propellant. In the preferred embodiment shown, the body 10 is formed of three moulded parts and it comprises two concentric annular injection elements 12, 14. The body 10 includes a first cavity 100 intended to ensure homogenization of the first propellant which enters this cavity via an orifice 105 formed at an upper end of the body at its axis of symmetry and which leaves the cavity through a central bore 110 and auxiliary bores 120, 130 formed at circular annuluses 125, 135 arranged between and around the annular injection elements 12, 14. The central bore 110 is provided in the center of the body 10, within the smallest diameter ring which is formed by the first injection element 12. The first series of auxiliary bores 120 is arranged at the first annulus 125 which is situated between the two annular injection elements whilst the second series of auxiliary bores 130 is arranged at the second annulus 135, which has a larger diameter than the first annulus and is situated outside the ring formed by the second injection element 14. The central bore 110 emerges into a circular space 112 closed by a central separating wall 114 and the auxiliary bores 120, 130 emerge into annular spaces 122, 132 closed by annular separating walls 124, 134 (the assembly advantageously forming toroidal cavities), homogenization of the propellant taking place in these cavities around the entire circumference of the injector before the propellant is injected into the injection elements from which it emerges, mixed with the second propellant to enter the combustion chamber 20.

This second propellant is delivered from the torus 140 (fed with propellant from a feed duct not shown) connected to the body 10 and opening into horizontal equal diameter passages 150 which pass between the vertical bores 120, 130 feeding the injection elements with the first propellant. These passages, pierced in the body 10 perpendicular to its axis and extending radially, emerge firstly into an annular cavity 160 intended for homogenization of the propellant speed prior to its injection into the second injection element 14, some of these passages subsequently being extended towards another annular cavity 170 concentric with the preceding cavity but of smaller diameter, and which is also intended for rapid homogenization of the propellant before its injection into the first injection element 12.

The connection between the injector and the combustion unit is made by means of a flange 180 extending from a lower end of the body 10, sealing between these two elements being ensured by a gasket 182 fitted to that flange, for example. It is important to note that this connection should leave an annular space 190 which, at the separating walls, opens upstream from the combustion chamber 20 and acts as a built-in resonator to stabilize combustion. Likewise, the support for the intermediate separating wall 124 is reinforced by the presence of columns 185 integral with the body of the injector and uniformly spaced around its lower end (this reinforcement is of course unnecessary with only a single injection element).

Figure 2:
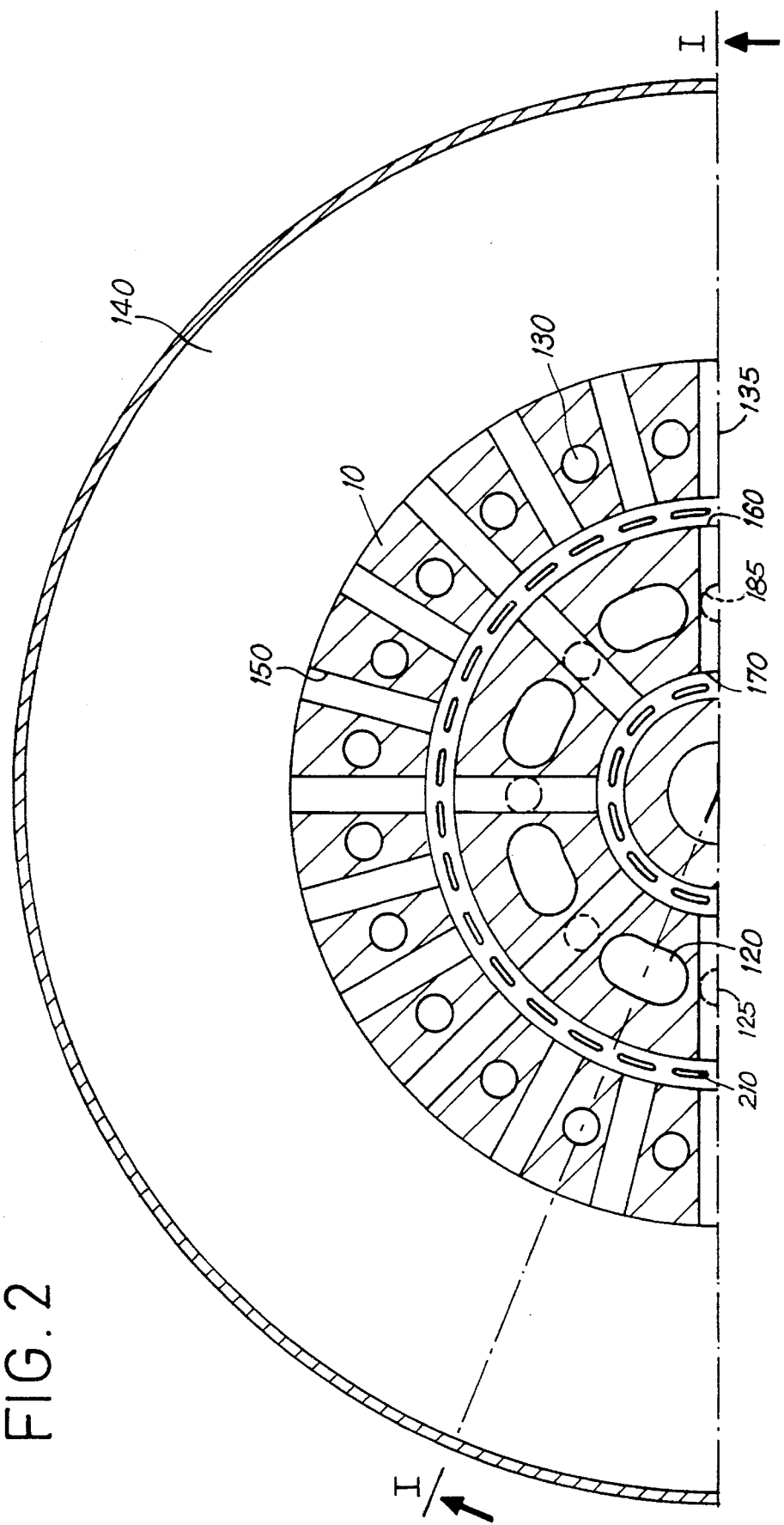
FIG. 2 is a view of section line II—II of FIG. 1.

FIG. 2 shows more precisely the network of vertical bores and horizontal passages which ensure that the propellants are delivered to the injection elements. In the embodiment shown, provision of the first propellant is assured not only by the central bore 110, but also by eight bores 120 of oblong cross-section which are uniformly spaced at the first annulus 125, and twenty-four bores 130 of circular cross-section which are uniformly spaced at the second annulus 135. It is important to note that in order to ensure that the propellants flow at the same speed in each of these bores, the cross-section of the central bore should be greater than that of the bores of the first annulus, which should in turn be greater than that of the bores in the second annulus. The second propellant is supplied to the injection elements via twenty-four horizontal passages 150 uniformly spaced around the central bore and emerging into the annular cavity 160 to feed the second injection element, eight of these passages being extended towards the annular cavity 170 to feed the first injection element. Again, the diameters of the different passages should be determined so that these injection elements are fed at the same speed.

Figure 3:
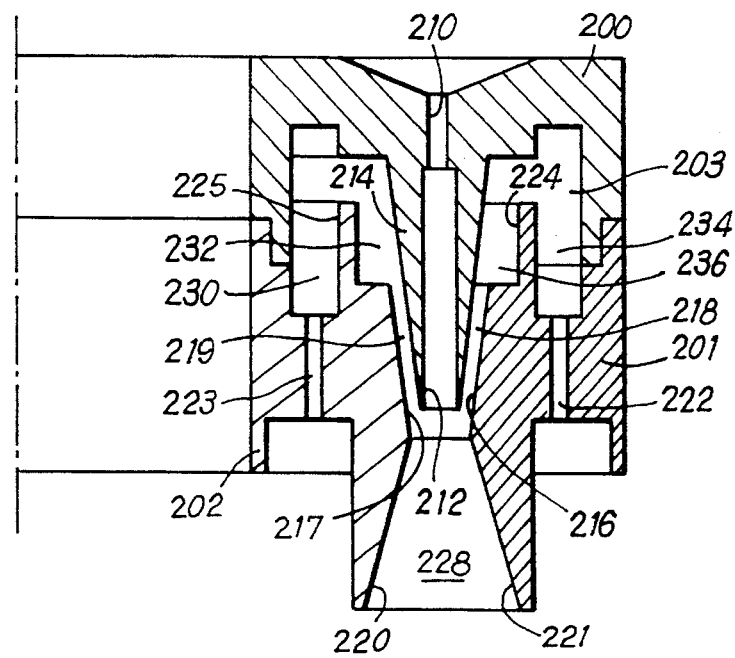
FIG. 3 shows a concentric slit injection element of the invention.

FIG. 3 shows a radial section through an annular injection element comprising a first external ring 201 surrounding a second internal ring 202 of smaller diameter and an upper part 200 forming a cover which is placed over these two rings to form an internal annular space 203 between themselves and the upper part. The annular upper part 200 is pierced, along its median diameter and parallel to the axis with calibration slits 210 which lead into the central annular slit 212 which is for injection of the second propellant. This injection slit is formed in an annular externally-converging portion 214 of said upper part, extending across the space 203 and penetrating partly into a converging portion formed by an internal wall 216 of the first ring and by an external wall 217 of the second ring, constant dimension spaces 218, 219 for injection of the first propellant being maintained simply between the portion 214 and the walls 216 and 217 which face it. In the extended portions of these converging walls, the rings 201 and 202 are additionally provided with diverging lengthening pieces 220 and 221 which between them create an annular confinement zone 228 in which the propellants are mixed and ejected towards the combustion chamber 20. On either side of these lengthening pieces, the rings 201 and 202 are pierced with calibration orifices 222, 223 which provide access to the internal space 203 so as to convey the first propellant to the injection slits 218, 219. Moreover, in order to create the head losses necessary for controlling propellant flow, the space 203 is partitioned by walls 224 and 225 connected to the parts 201 and 202 respectively, these walls being arranged on either side of the convergent portions 216, 217 and creating four annular chambers 230, 232, 234, 236 within the space 203.

The operation of the injection system of the invention is summarized as follows. To clarify the description, it is assumed that the first propellant is liquid hydrogen (LH2) and the second propellant is liquid oxygen (LOX). Of course, other liquid propellants are equally possible. Likewise, the architecture described may perfectly well be used more simply with gaseous hydrogen.

The liquid hydrogen is injected into the body 10, from a feed duct (not shown), through the central orifice 105, and enters the cavity 100 which is intended to homogenize the speeds of the propellant and from which the propellant escapes via the various bores leading out of that cavity. The dimensions of each series of bores 110, 120, 130 are determined so that the hydrogen flows through each of them at the same speed. The hydrogen runs along these bores towards the spaces 112, 122, 132 formed at the bottom of the bores and defined by the walls 114, 124, 134 separating the injection system from the combustion chamber 20. In these spaces, the liquid hydrogen is homogenized over the entire circumference of the injector before entering the injection elements via the calibration orifices 222, 223 situated at the base of those elements on the annular rings 201, 202 of which they are constituted. The number and dimensions of these calibration orifices are chosen so as to generate the head loss necessary to ensure the desired propellant flowrate. After passing through these orifices, the hydrogen enters the space 203 and is homogenized again in the annular chambers 232 to 236 through which it passes (the walls 224, 225 ensuring the pre-determined head losses) to lead into the constant dimension spaces 218, 219 surrounding the annular injection slit 212 from which emerges the sheet of liquid oxygen, the origin of which is now explained.

The liquid oxygen arrives a the torus 140 from a feed duct, and leaves the torus via the radial passages 150 which emerge into the annular cavity 160 nearest the outside, in which the speed of the oxygen is homogenized over the entire circumference of the injector before entering the outside injection element 14 via the calibration slits 210 formed at its top in the upper part 200, the number and dimensions of these slits being chosen to ensure a head loss corresponding to a given propellant flowrate. Moreover, some of these radial passages are extended towards the most central (and therefore smallest-diameter) annular cavity 170 in which the oxygen is homogenized again over the entire circumference of the cavity before entering the central injection element 12 via the calibration slits formed at its top in the upper portion of that element, the number and dimensions of these slits being chosen, as for the other injection element, so as to obtain a given propellant flowrate which is identical to the preceding flowrate. It is important to remember that the number and dimensions of the passages which extend towards the central element are chosen so that the speed of the oxygen flowing along these passages is the same as that of the oxygen flowing along the preceding passages. The liquid oxygen which is conveyed to the injection elements via the calibration slits then enters the annular injection slit 212 of each of those elements from where it escapes in concentric sheets on which the liquid hydrogen impacts after leaving the slits or constant dimension spaces 218, 219 which surround each of the annular injection slits.

Figure 4:
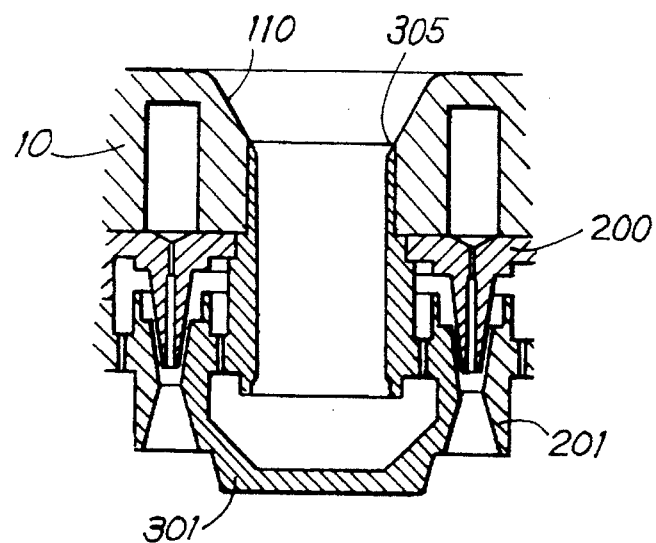
FIGS. 4 and 5 are variants on the details of the architecture of FIG. 1.

FIG. 4 is a variant on the central wall 114 in which this wall is an integral part of the annular ring 201 of the central injection element 12. With this configuration, it is possible to reduce the number of welds necessary for holding together the different elements making up this injector. The connection between the modified annular ring 301 and the body 10 is now achieved with a single upstream weld 305 in the central bore 110. In the embodiment of FIG. 1, two welds were necessary to allow these connections to be made; one between the annular ring and the central wall and one between the annular ring and the body.

Figure 5:
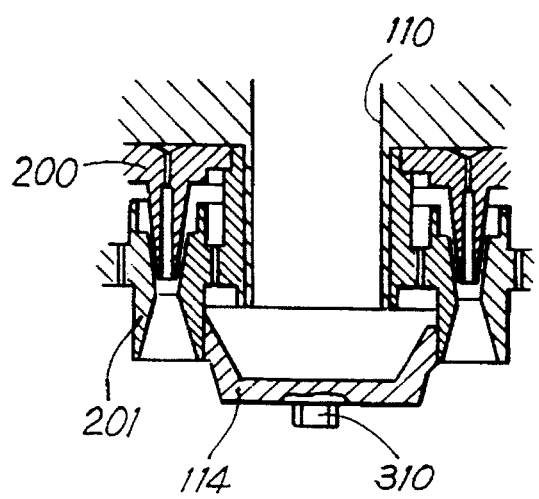

FIG. 5 is another variant on the connection between the central wall 114 and the annular ring 201. In this configuration, the connection is simply screwed, a screw head 310 being secured beforehand to the central wall to facilitate the mounting and subsequently being sawn off. The connection between the body and the annular part is achieved by welding to the downstream end of the central bore 110, as in the configuration of FIG. 1.

Figure 6:
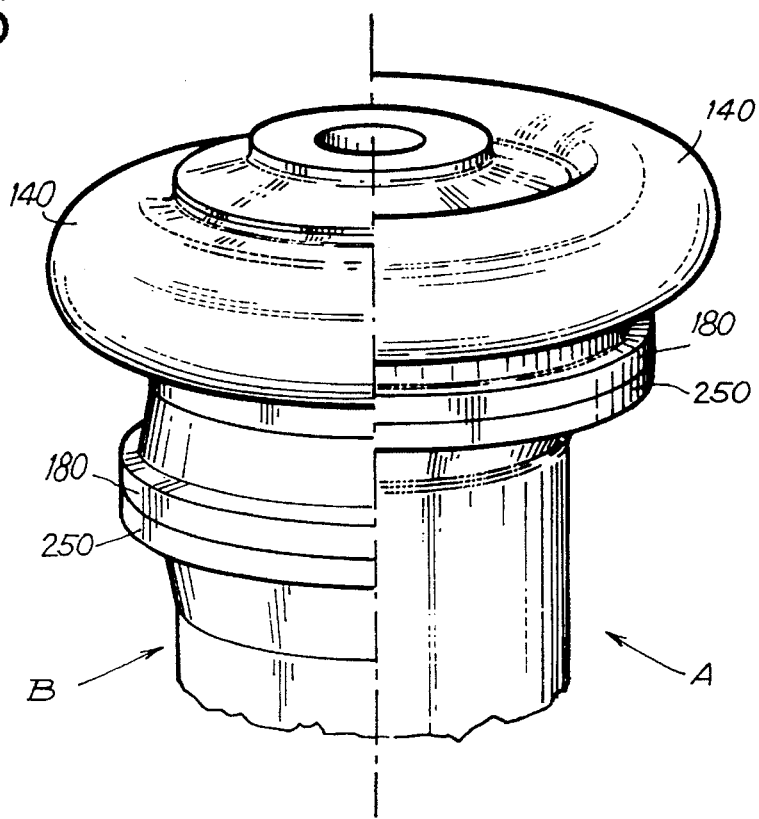
FIG. 6 is an external view of two variants of a combustion chamber with the architecture of the invention.

FIG. 6 is an external view of a combustion unit fitted with an injector of the invention showing two variants on the connection between these elements. Variant A corresponds to the representation of FIG. 1 in which the connection between the injector and the combustion unit is achieved by the flange 180 which cooperates with a flange 250 on the combustion unit 20. In variant B, the torus 140 is recessed slightly relative to the upper end of the injector and the connection between that injector and the combustion unit is therefore made downstream of that injector. It may be noted that, in variant A, the connection is produced at the injector and, unlike the embodiment of variant B, is not subjected to the high temperatures which exist in the combustion chamber.

With the proposed architecture, the operation of the injector of the invention is rendered more reliable. The risk of internal fluid losses bringing the two propellants together is removed and in the case where LH2/LOX is used, the fact that the oxygen is completely surrounded by the hydrogen eliminates any danger of the hot oxygen coming into contact with the chamber separation walls. Moreover, an essential feature is that the injector thus obtained requires only a small number of parts (about ten) for its manufacture, which is considerably fewer than that of any of the injectors which are currently produced using conventional techniques, which number may be about one hundred. It is also important to note that as the majority of the parts to be produced are bodies of revolution, their production is simplified and the resulting costs are therefore much lower.

We claim:

1. A parallel-sheet injector of a combustion chamber comprising an injector body having an axis, an injector plate connected to said injector body, and at least one annular injection element for injection concentric sheets of a first propellant and a second propellant in the combustion chamber through said injector plate, said annular injection element having a top surface and a base surface and comprising a central annular injection slit which is fed with the second propellant from the top surface of said annular injection element, and two other annular injection slits surrounding said central slit and which are fed with the first propellant from the base surface of said annular injection element through an annular homogenization cavity of said annular injection element, said slits emerging into an annular confinement zone in which said first and second propellants are mixed and ejected through said injector plate into the combustion chamber.

2. The parallel-sheet injector according to claim 1, wherein said injection element is fed with the first propellant from a central cavity and from at least one other annular cavity arranged at the base surface of said injection element and fed from bores uniformly spaced at at least one concentric annulus, arranged parallel to said axis and extending from a propellant feed cavity.

3. The parallel-sheet injector according to claim 1, wherein said injection element is fed with the second propellant from at least one annular cavity arranged at the top surface of said injection element and fed from passages arranged perpendicular to said axis and extending radially from a propellant feed torus.

4. The parallel-sheet injector according to claim 3, wherein said torus is coaxially connected to the injector body.

5. The parallel-sheet injector according to claim 2, wherein:

said injection element is fed with the second propellant from at least one annular cavity arranged at the top surface of said injection element and fed from passages arranged perpendicular to said axis and extending radially from a propellant feed torus; and the number and dimensions of said passages and of said bores are chosen so that the propellants flow with identical speeds through the injection slits of the various injectors.

6. The parallel-sheet injector according to claim 1, wherein said injector is separate from the combustion chamber and is connected to it via a central separating wall and at least one other separating wall.

7. A parallel-sheet injector according to claim 6, wherein said central wall is screwed to one end of the injection element.

8. The parallel-sheet injector according to claim 6, wherein said central wall forms part of the injection element.

9. The parallel-sheet injector according to claim 6, wherein support of the at least one other separating wall is reinforced by the presence of columns integral with the injector body and uniformly spaced about its lower end.

10. The parallel-sheet injector according to claim 6, wherein the body also includes an annular space which, at the separating walls, opens into the combustion chamber, so as to create a built-in resonance zone which guarantees stability of combustion.

11. The parallel-sheet injector according to claim 1, wherein said injector comprises two concentric annular injection elements.

12. An annular injection element to be used in a parallel-sheet injector of a combustion chamber comprising an injector body having an axis, an injector plate connected to said injector body, and at least one said annular injection element for injecting concentric sheets of a first propellant and a second propellant in the combustion chamber through said injector plate, said annular injection element comprising:

a top surface and a base surface and comprising a central annular injection slit which is fed with the second propellant from the top surface of said annular injection element, and two other annular injection slits surrounding said central slit and which are fed with the first propellant from the base surface of said annular injection element through an annular homogenization cavity of said annular injection element, said slits emerging into an annular confinement zone in which said first and second propellants are mixed and ejected through said injector plate into the combustion chamber; and an external ring and an internal ring which are concentric and between which there extends an externally converging annular portion integral with an upper part which forms a cover covering said two rings, and an internal space disposed between these rings and the upper part, on either side of the annular portion, this space allowing homogenization of the first propellant.

13. The injection element according to claim 12, wherein said internal space is partitioned by walls of dimensions which are chosen to ensure head losses necessary for controlling a flowrate of the first propellant.

14. The injection element according to claim 12, wherein each of the said internal and external rings comprises a converging wall which faces the externally converging annular portion, two constant dimension spaces being maintained between said walls and the annular portion so as to form the annular injection slits for the first propellant.

15. The injection element according to claim 14, wherein each of said converging walls of the internal and external rings is extended by diverging walls to form a confinement zone within which the first and second propellants are mixed.

16. The injection element according to claim 12, wherein the connection between the two other annular injection slits and annular cavities arranged at the base surface of the injection element is provided by calibration orifices pierced through the internal and external rings of the injection element.

17. The injection element according to claim 12, wherein the connection between the central injection slit and an annular cavity arranged at the top surface of the injection element is provided by calibration orifices pierced through the upper part of the injection element.

18. The injection element according to claim 17, wherein said calibration orifices are oblong in shape.

* * * * *

UNITED STATES PATENT AND TRADEMARK OFFICE
CERTIFICATE OF CORRECTION

PATENT NO. : 5,603,213
DATED : February 18, 1997
INVENTOR(S) : Martin Sion et al.

It is certified that error appears in the above-indentified patent and that said Letters Patent is hereby corrected as shown below:

Column 1, line 33, "the geometry" should read —that geometry—.

Signed and Sealed this

Fourth Day of August, 1998

Attest:

BRUCE LEHMAN

*Attesting Officer*  *Commissioner of Patents and Trademarks*